Figure 1:
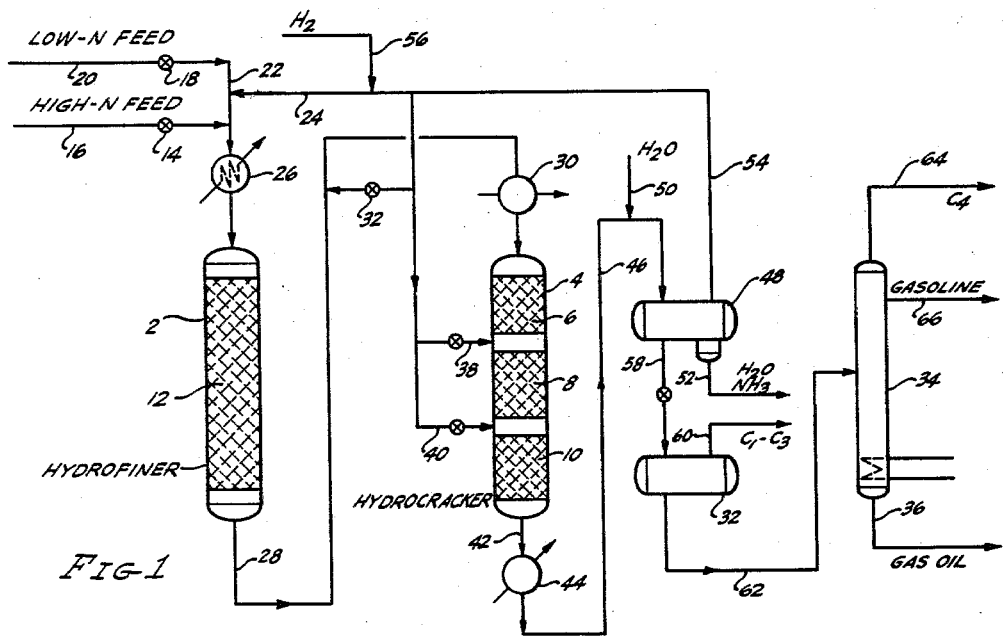

INVENTORS
WILLIAM E. BRADLEY
FRED C. WOOD
BERNAL PERALTA

ATTORNEY

United States Patent Office 3,186,936
Patented June 1, 1965

3,186,936
PROCESS FOR HYDROCRACKING A NITROGEN CONTAINING FEED INCLUDING PRETREATMENT OF CATALYST
Frederick C. Wood, Fullerton, William E. Bradley, Santa Ana, and Bernal Peralta, Fullerton, Calif., assignors to Union Oil Company of California, Los Angeles, Calif., a corporation of California
Filed Mar. 18, 1963, Ser. No. 265,648
16 Claims. (Cl. 208—89)

This invention relates to the catalytic hydrocracking of high-boiling hydrocarbon feedstocks to produce therefrom lower boiling hydrocarbons, boiling for example in the gasoline and/or jet fuel range. More specifically, the invention is concerned with the hydrocracking of feedstocks contaminated with organic nitrogen compounds, utilizing relatively low hydrocracking temperatures and pressures. Still more specifically, the invention is concerned with methods for preconditioning the catalyst so as to assure maximum activity for hydrocracking nitrogen-contaminated feedstocks, and methods for initiating fixed-bed hydrocracking runs in such manner as to avoid initial damage to the catalyst, thereby assuring minimum initial hydrocracking temperatures with resultant extended run lengths.

Briefly stated, the principal novel feature of the process comprises pretreating the fresh, or freshly regenerated, catalyst with a substantially nitrogen-free feedstock in admixture with hydrogen, and at relatively low temperatures of about 300–650° F. and then initiating the hydrocracking of the nitrogen-contaminated feedstock at temperatures between about 650° and 775° F. The pretreatment step appears to increase the tolerance of the catalyst for basic nitrogen compounds, minimizing their poisoning effect, all of which is reflected in relatively low initial hydrocracking temperatures. Where the feedstock contains more than about 100 parts per million of organic nitrogen, it is preferred to utilize an initial "integral" prehydrofining treatment, wherein the feedstock is first subjected to hydrofining, and total effluent therefrom, including ammonia derived from the decomposition of organic nitrogen compounds, is then hydrocracked over the preconditioned hydrocracking catalyst.

In the preferred operation utilizing the initial prehydrofining treatment, the invention embraces also a novel and advantageous method for bringing the hydrofining and hydrocracking catalysts up to the respective operating temperatures, which method eliminates or minimizes any initial and irreversible damage to the hydrocracking catalyst. Such damage can result if (a) the catalyst is preheated in an inert atmosphere and then suddenly contacted with the feedstock, or (b) the catalyst is preheated by means of circulating hydrogen-feedstock mixtures wherein the feedstock contains substantial quantities of organic nitrogen compounds. Both of these undesirable results are avoided herein by the following catalyst preheating and preconditioning technique:

(1) Establishing an initial contacting sequence wherein a pretreatment mixture of hydrogen and a substantially nitrogen-free hydrocarbon feedstock is preheated and passed through the hydrofining catalyst bed and then through the hydrocracking catalyst bed;

(2) Incrementally raising the temperature of the pretreatment mixture at the hydrofiner inlet, thereby gradually heating the hydrofining catalyst bed to the initial temperature desired for treatment of the nitrogen-contaminated feedstock;

(3) During at least the terminal portion of the initial contacting sequence, cooling the effluent from the hydrofining catalyst bed so as to avoid over-cracking, with resultant catalyst damage, in the hydrocracking catalyst bed;

(4) Establishing an interim contacting sequence wherein hydrogen and a blend of the nitrogen-free feedstock and the nitrogen-contaminated feedstock is passed through the hydrofining catalyst bed and then through the hydrocracking catalyst bed;

(5) During the interim contacting sequence, maintaining the temperature in the hydrofining catalyst bed at the desired hydrofining level while concurrently (a) increasing the proportion of nitrogen-contaminated feedstock in the feed blend, and (b) allowing the temperature of the hydrofiner effluent to rise gradually so as to preheat the hydrocracking catalyst bed to the desired initial hydrocracking temperature for the nitrogen-contaminated feedstock; and (6) Terminating the interim contacting sequence and establishing the finally desired contacting sequence with nitrogen-contaminated feedstock plus hydrogen passing through both of the catalyst beds at the desired operating temperatures.

The foregoing procedure not only effects a desirable pretreatment of the hydrocracking catalyst with a relatively nitrogen-free feedstock, but also avoids any "shock" damage to the catalyst resulting from an initial contact of feed therewith at hydrocracking temperatures, as well as any damage resulting from the presence of excessive amounts of organic nitrogen compounds in the feed thereto.

The poisoning effect of basic nitrogen compounds upon hydrocracking catalysts is well recognized in the art. This effect apparently stems from the adsorption of basic nitrogen compounds on the active acidic centers of the catalyst, thereby repressing cracking activity. It is known that the effect can be minimized by operating at relatively high hydrocracking temperatures, which favor desorption of nitrogen compounds. However, this solution to the problem is not practical because high hydrocracking temperatures give relatively non-selective cracking, with much production of light gases and coke. Also, due to the high temperatures, and the more rapid deactivation rate of the catalyst at these temperatures, only short run lengths are permissible where the hydrocracking run must be initiated at temperatures above about 750° F.

The present invention stems from our discovery of two other methods by which the poisoning effect of basic nitrogen compounds may be minimized. Firstly, it has been found that if the catalyst is pretreated with a nitrogen-free feedstock, so as to deposit a small amount of coke, the adsorption on active centers of basic nitrogen compounds is minimized, thus resulting in a higher initial activity of the catalyst.

Secondly, it has been found that at relatively low hydrocracking temperatures, below about 825° F., there is a marked difference between the poisoning effect of heavy organic nitrogen compounds (or at least some types thereof), as compared to ammonia. With a sufficiently active catalyst, substantial amounts of ammonia can be tolerated in the reaction mixture, whereas organic nitrogen compounds are much more detrimental. Specifically, it has been found that organic nitrogen compounds tend to become irreversibly adsorbed on the catalyst, and exert a relatively permanent poisoning effect at the low hydrocracking temperatures employed herein. As a result of this phenomenon, if the hydrocracking catalyst is brought up to hydrocracking temperatures, as, e.g., from room temperature, by means of preheated feed-hydrogen mixtures containing organic nitrogen compounds, a much lower activity is obtained than if the feed were pretreated to decompose the organic nitrogen compounds into ammonia. Moreover, this low activity level persists for at least several weeks, and normally cannot be reversed except by going to hydrocracking temperatures above about 825° F., at which the catalyst is damaged by coke laydown.

The differing effects of organic nitrogen compounds and of ammonia upon hydrocracking catalysts can be readily observed in the "integral" hydrofining-hydrocracking series combination, wherein the feed is first hydrofined, and the entire hydrofining effluent is passed through the hydrocracking catalyst bed. When a system such as this is brought on-stream from a low temperature by preheating with feed-hydrogen mixtures, the following phenomenon appear to occur: Firstly, until the hydrofining catalyst is brought up to the required hydrofining temperature, the effluent therefrom will still contain substantial amounts of organic nitrogen compounds. These organic nitrogen compounds are then adsorbed on the first portion of the hydrocracking catalyst bed. This proceeds until the required hydrofining temperatures are reached to reduce the organic nitrogen level to below about 50 parts per million, whereupon nearly all of the nitrogen is in the form of ammonia, which has a more reversible and less drastic effect upon the hydrocracking catalyst.

As hydrocracking proceeds from this point onward, repeated temperature profile measurements in the hydrocracking catalyst bed have shown that the first part of the catalyst bed is substantially "dead," i.e., there is a substantially flat temperature profile, indicating little or no activity; any conversion taking place is restricted to the down-stream portions of the catalyst bed. This is aptly illustrated by temperature profile curve A of FIGURE 2. This profile represents actual data taken in a hydrocracking catalyst bed brought on-stream as abovedescribed, and where the average bed temperature (with two quench points) was adjusted so as to achieve a 40% conversion to 400° F. end-point gasoline. It will be noted that there was substantially no temperature rise during the first 30-35% of the catalyst bed, all the conversion being obtained in the last two-thirds of the catalyst bed. This type of profile persists, sometimes for the entire run length, indicating that the poisoning of the first portion of the bed is substantially irreversible under normal process conditions. As a result of the essentially dead portion of the catalyst bed, it was found necessary to maintain an average bed temperature of about 762° F. in order to maintain the 40% conversion.

Figure 2:
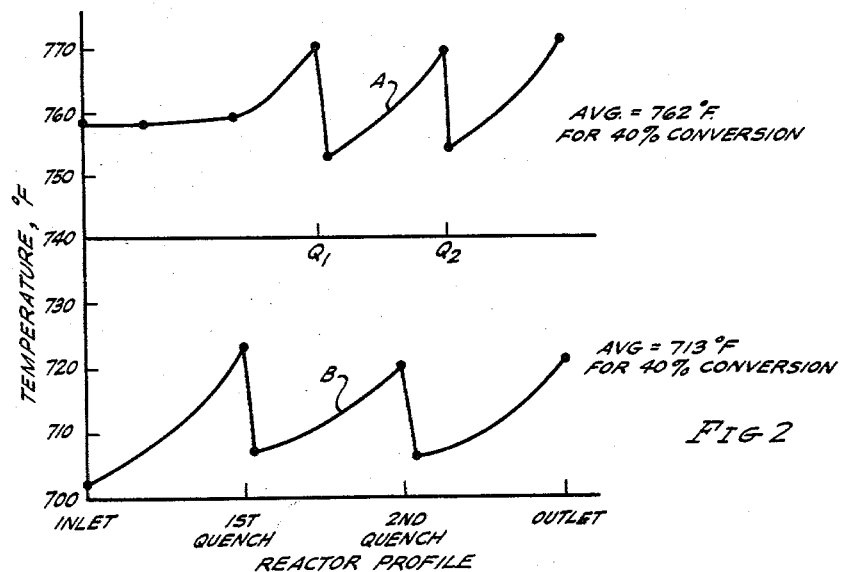

Curve B of FIGURE 2 shows the marked benefits obtained by the process of this invention, which eliminates the flat temperature profile in the first part of the hydrocracking catalyst bed. This curve represents data obtained when the hydrocracking catalyst was put on-stream as described in Example I. In this case, no feedstock containing more than about 50 parts per million of organic nitrogen ever contacted the hydrocracking catalyst, and there was a pretreatment with nitrogen-free feed. As a result, the entire catalyst bed was active, and the average bed temperature for 40% conversion was only 713° F. This marked benefit is believed attributable both to the substantially complete elimination of organic nitrogen from the feedstock, and to the beneficial pretreatment of the hydrocracking catalyst with a nitrogen-free feedstock before it was contacted with the ammonia-laden hydrofiner effluent.

To the extent that the foregoing involves a theoretical explanation for the beneficial results obtained herein, it is not intended that the invention be restricted thereto. The observed facts to which the invention is limited are simply that the pretreatment with nitrogen-free feed effects an improvement in activity for the hydrocracking of nitrogen-containing feedstocks, and that in low-temperature hydrocracking processes it is definitely beneficial to assure that substantially all organic nitrogen in the feed is converted to ammonia before it contacts the catalyst. The pretreatment with nitrogen-free feed does however increase the catalyst tolerance not only for ammonia, but for organic nitrogen compounds.

From the foregoing, it will be apparent that the principal objective of the invention is to provide economical methods for the hydrocracking of nitrogen-containing feedstocks at relatively low temperatures, below about 800° F. A further object is to provide methods for hydrocracking nitrogen-containing feedstocks which avoid the conventional and expensive non-integral prehydrofining of such feedstocks, which involves interstage condensation and washing to remove ammonia therefrom. A further object is to provide extended hydrocracking run lengths between catalyst regenerations, using nitrogen-containing feedstocks. A specific objective is to provide, in an integral hydrofining-hydrocracking sequence, a convenient and economical method for raising the hydrofining and hydrocracking catalyst to the desired operating temperatures without damaging the hydrocracking catalyst. Other objectives will be apparent from the more detailed description which follows.

Reference is now made to FIGURE 1, which is a flowsheet illustrating a start-up and pretreating procedure utilizing the preferred integral hydrofining-hydrocracking combination. In this modification, hydrofiner 2 is operated adiabatically, but if desired, a more isothermal operation may be obtained by means of one or more intermediate quench points, as in hydrocracker 4. Hydrocracker 4 is semi-adiabatic in that two hydrogen-quench points are utilized between hydrocracking catalyst beds 6, 8 and 10. It is to be understood however that hydrocracker 4 can also be operated adiabatically, though it is generally preferable to employ one or more quench points. At the beginning of the operation to be described, hydrofining catalyst bed 12 and hydrocracking catalyst beds 6, 8 and 10 comprise freshly loaded catalysts at approximately ambient atmospheric temperature.

The process utilizes a low-nitrogen start-up feed, and a high-nitrogen process feed. The start-up feed should contain less than about 100 parts, and preferably less than about 50 parts per million of organic nitrogen; the process feed contains relatively more nitrogen, and up to about 2% by weight or more. In its most preferred aspect, the start-up feed contains less than about 20 parts per million of organic nitrogen, and less than about about 100 parts per million of ammoniacal nitrogen. Either or both of the feedstocks may contain sulfur in amounts up to about 5% by weight, although it is preferable to use a start-up feed which contains less than about 1% of sulfur. In other respects the feeds may if desired be similar in character, although it is further preferred that the start-up feed contain less than about 35% by volume of aromatic hydrocarbons in order to minimize exothermic temperature rises in hydrocracker 4. Preferred characteristics of the respective feedstocks are as follows:

TABLE 1

| | Start-up feed | Process feed |
|---|---|---|
| Boiling range, ° F.: | | |
| Initial boiling point | 350–600 | 400–550 |
| End boiling point | 450–650 | 500–1,000 |
| Gravity, ° API | 25–40 | 15–35 |
| Nitrogen, p.p.m | 0–50 | 100–20,000 |
| Sulfur, wt. percent | 0–1 | 0–5 |
| Aromatics, vol. percent | 0–35 | 10–60 |

To initiate the pretreatment cycle, valve 14 in high-nitrogen feed line 16 is closed, and valve 18 in pretreatment feed line 20 is opened. Pretreatment feed then flows in to line 22 and is mixed therein with recycle and/or fresh hydrogen from line 24 in amounts of between about 1,000 to 20,000 s.c.f./b. of feed. The resulting mixture then flows through preheater 26 where it is brought initially to a temperature of about 300–500° F. The preheated mixture then flows through hydrofiner 2 while the inlet temperature from preheater 26 is gradually or incrementally raised up to the desired initial hydrofining temperature for the high-nitrogen process feed. This temperature will normally lie within the range of about 600–750° F. This operation is continued until the entire catalyst bed 12 is brought to the desired hydrofining temperature.

In hydrofiner 2, there will be some slight exothermic temperature rise resulting from hydrogenation of unsaturates, aromatics and/or the decomposition of sulfur compounds. The pretreatment hydrofiner effluent is withdrawn via line 28 and passed via heat exchanger 30 into the top of hydrocracker 4. As the effluent temperature in line 28 rises, a point will be reached at which the feed will be hydrocracked to an undesirable degree in hydrocracker 4. Before this point is reached, it is desirable to cool the effluent in exchanger 30 (or by means of a cool recycle quench gas stream from line 32), so as to maintain adequate control over the degree of hydrocracking in hydrocracker 4. It will be understood that with the low-nitrogen pretreatment feed, hydrocracking in reactor 4 will take place at a much lower temperature than that required for hydrocracking the hydrofined high-nitrogen process feed. For this reason, so long as pure pretreatment feed is being used, it is normally desirable to keep the inlet temperature to reactor 4 at below about 500° F. However in some cases, as where a sulfur-containing pretreatment feed is used, or one very low in aromatics, inlet temperatures as high as about 550° F. may be permissible. These precautions apply to a hydrocracking catalyst which is substantially fresh, or freshly regenerated. However if the pretreatment is continued for an extended period of time, such that the catalyst becomes partially deactivated, the hydrocracking inlet temperatures may be allowed to rise to, e.g., 600–650° F. In any case, the controlling factor is to avoid overcracking in the pretreatment cycle in such manner as to damage the catalyst by excessive coke laydown, or by sharp temperature rises. In general, overcracking is indicated when the conversion per pass to 400° F. end-point gasoline rises above about 75% by volume.

The pretreating period in reactor 4 normally will continue for about 6 to 100 hours, although it can be continued for longer periods of, e.g., 50–100 days without damaging effects. In any event, it is continued until the catalyst bed in reactor 4 is up to within about 100–200° F. of the desired initial hydrocracking temperature for the process feed. During the pretreatment sequence, it is normally unnecessary to utilize interstage quench since there is little exothermic temperature rise.

The pretreatment effluent from reactor 4 may be subjected to the same condensation and fractionation recovery procedure to be utilized for the process feed, or it may be treated in other manners not shown. In one modification it may be recovered directly from low pressure separator 32 and recycled back to hydrofiner 2, thus bypassing fractionating column 34. Ordinarily however it is preferred to fractionate the pretreatment effluent to recover any gasoline synthesized in hydrocracker 4, and in this case the bottoms fraction in line 36 can be recycled back to the hydrofiner.

In one modification of the process, at the end of the pretreatment cycle, valve 18 is closed and valve 14 opened, thus permitting the high-nitrogen process feed to flow in admixture with hydrogen through preheater 26, hydrofiner 2, transfer line 28, heat exchanger 30 and hydrocracker 4. Upon introducing high-nitrogen feed into hydrofiner 2, there will be a considerable exothermic temperature rise, which normally will bring the effluent in line 28 at least up to the desired hydrocracking temperature in reactor 4. Heat exchanger 30 is then operated for heating or cooling the feed mixture to hydrocracker 4 to the desired inlet temperature of, e.g., 650–800° F. Hydrocracking proceeds in reactor 4 semi-adiabatically with interstage injection of cool quench hydrogen via lines 38 and 40.

In most cases it will be found desirable to avoid an abrupt change from the pretreatment feed to the high-nitrogen process feed. This is particularly desirable for example when there is a substantial difference between the character of the two feeds, and/or when the maximum temperature reached by the catalyst bed in reactor 4 at the end of the pretreatment period is substantially lower than the necessary initial hydrocracking temperature for the high-nitrogen process feed. In these cases, there may be a sudden and uncontrollable upset in process conditions when the process feed reaches catalyst bed 6 at substantially higher temperatures than were previously employed for the pretreatment feed. To overcome these effects, a more gradual shift from the pretreatment feed to the process feed may be accomplished by incrementally increasing the ratio of process feed to pretreatment feed, and concurrently therewith allowing the temperature of the inlet feed mixture to reactor 4 to rise more gradually to the desired hydrocracking temperatures.

With hydrofiner 2 and hydrocracker 4 now on-stream with high-nitrogen process feed, operative process conditions fall within the following general ranges:

TABLE 2

| | Hydrofining conditions | | Hydrocracking conditions | |
|---|---|---|---|---|
| | Operative | Preferred | Operative | Preferred |
| Temperature, ° F. (Av. Bed): | | | | |
| Beginning of run | 650–750 | 680–725 | 650–775 | 680–725 |
| End of run | 700–850 | 750–800 | 700–850 | 770–825 |
| Pressure, p.s.i.g. | 300–5,000 | 500–2,500 | 300–5,000 | 500–2,500 |
| LHSV | 0.1–20 | 0.2–5 | 0.1–20 | 0.5–5 |
| H₂/oil ratio, M s.c.f./b. | 1–25 | 2–15 | 1–25 | 2–15 |

The same general conditions may be observed during the pretreatment sequence, except for temperatures which are adjusted as previously described.

The hyrocracked effluent from hydrocracker 4 is withdrawn via line 42, cooled in condenser 44, and transferred via line 46 to high-pressure separator 48. Preferably, the condensed effluent is washed with water added via line 50 to line 46, in order to scrub out ammonia and soluble ammonium salts. Spent wash water with dissolved ammonia is removed from separator 48 via line 52. Recycle hydrogen is withdrawn via line 54, mixed with fresh makeup hydrogen from line 56, and sent to hydrofiner 2 as previously described.

High-pressure condensate in separator 48 is withdrawn via line 58 and flashed into low-pressure separator 32, from which light hydrocarbon gases are exhausted via line 60. Low-pressure condensate in separator 32 is then transferred via line 62 to fractionating column 34, from which most of the remaining $C_3$–$C_4$ hydrocarbons may be taken overhead via line 64, $C_5$–400° F. end-point gasoline via side-cut line 66, and 400° F.+bottoms via line 36. This bottoms fraction may be recycled to hydrofiner 2, hydrocracked in a second hydrocracking stage, or utilized in jet or diesel fuels.

The process as described above may be continued for periods of 6–12 months or more between catalyst regenerations. These long run lengths are obtainable by virtue of the described catalyst pretreatment procedures, which permit initiation of the hydrocracking run at relatively low temperatures, which are incrementally raised during the run to maintain the desired conversion per pass, until a terminal temperature is reached at which there is an economically undesirable production of light gases and coke. This terminal temperature normally lies between about 770° and 825° F. The catalyst is then regenerated by conventional procedures and the regenerated catalyst is cooled and placed on-stream by the same procedure previously described.

Suitable hydrofining catalysts for the prehydrofining operation include in general the oxides and/or sulfides of the Groups VIB and/or Group VIII metals, preferably supported on a relatively non-cracking adsorbent oxide carrier such as alumina, silica, titania, and the like. Preferred hydrofining catalysts include for example mixtures of the oxides and/or sulfides of cobalt plus molybdenum, nickel plus molybdenum, or nickel plus tungsten, preferably supported on a carrier such as alumina, or alumina containing a small amount of coprecipitated silica gel.

The hydrocracking catalysts employed herein may consist of any desired combination of a refractory cracking base with a suitable hydrogenating component. Suitable cracking bases include for example mixtures of two or more difficultly reducible oxides such as silica-alumina, silica-magnesia, silica-zirconia, alumina-boria, silica-titania, silica-zirconia-titania, acid-treated clays and the like. Acidic metal phosphates such as aluminum phosphate may also be used. The preferred cracking bases comprise partially dehydrated, zeolitic, crystalline molecular sieves, e.g., of the X or Y crystal types, having relative uniform pore diameters of about 8–14 A., and comprising silica, alumina and one or more exchangeable zeolitic cations.

A particularly active and useful class of molecular sieve cracking bases are those having a relatively high $SiO_2/Al_2O_3$ ratio, e.g., between about 2.5 and 10. The most active forms are those wherein the exchangeable zeolitic cations are hydrogen and/or a divalent metal such as magnesium, calcium or zinc. In particular, the "Y" molecular sieves, having crystal pores of about 9–10 A. in diameter, and wherein the $SiO_2/Al_2O_3$ ratio is about 5–6 are preferred, either in their hydrogen form, a divalent metal form, or a mixed divalent metal-hydrogen form. Normally, such molecular sieves are prepared first in the sodium or potassium form, and the monovalent metal is ion-exchanged out with a divalent metal, or where the hydrogen form is desired, with an ammonium salt followed by heating to decompose the zeolitic ammonium ion and leave a hydrogen ion. (These hydrogen zeolites are sometimes referred to as being "decationized.") Molecular sieves of this nature are described more particularly in Belgian Patents Nos. 577,642, 598,-582, 598,683 and 698,682.

The foregoing cracking bases are compounded, as by impregnation, with from about 0.5% to 25% (based on free metal) of a Group VIB or Group VIII metal promotor, e.g., an oxide or sulfide of chromium, tungsten, cobalt, nickel, or the corresponding free metals, or any combination thereof. Alternatively, even smaller proportions, between about 0.05% and 2% of the metals platinum, palladium, rhodium or iridium may be employed. The oxides and sulfides of other transitional metals may also be used, but to less advantage than the foregoing.

In the case of zeolitic type cracking bases, it is desirable to deposit the hydrogenating metal thereon by ion exchange. This can be accomplished by digesting the zeolite with an aqueous solution of a suitable compound of the desired metal, wherein the metal is present in a cationic form, and then reducing to form the free metal, as described for example in Belgian Patent No. 598,686.

Although as indicated above, substantially any hydrocracking catalyst may be used herein, it is not to be assumed that all such catalysts are equivalent, or that they will all give a commercially feasible process. For hydrocracking at below about 825° F. as required herein, and in the presence of ammonia, it is highly desirable to use catalysts which have both a high cracking activity and high hydrogenating activity; otherwise it will be necessary to employ economically unattractive low space velocities. For economical processes operated at above about 0.5 LHSV, the preferred catalysts are composed of a Group VIII noble metal, e.g., platinum, palladium, rhodium, iridium or ruthenium, combined by ion-exchange with one of the zeolitic molecular sieve cracking bases of the Y crystal type, wherein the zeolitic cations are predominantly hydrogen and/or a divalent metal such as calcium, magnesium, or zinc. The more conventional catalysts such as platinum on silica-alumina gel, or nickel on silica-alumina gel, will require-alumina gel, or nickel in general below about 0.5 in order to achieve the desired conversion at the specified hydrocracking temperatures.

The following examples are cited to illustrate the invention, but are not however to be construed as limiting in scope:

Example 1

This example illustrates the pretreatment and start-up procedure for an integral hydrofining-hydrocracking operation, substantially as illustrated in FIGURE 1. The pretreatment feed-stock is a light gas oil boiling between about 420° and 520° F., containing about 2.6 parts per million of nitrogen and 12 parts per million sulfur, and 24 volume-percent aromatics. The high-nitrogen process feed is a heavy coker distillate gas oil boiling over the range of about 400–875° F., having an A.P.I. gravity of 24.6°, and containing 0.237 weight-percent nitrogen and 0.77 weight-percent sulfur. The hydrofining catalyst is a presulfided composite of about 3% cobalt oxide and 15% molybdenum oxide supported on an alumina carrier which was stabilized by the addition of 5% $SiO_2$. The hydrocracking catalyst is composed of about 0.5% by weight of palladium added by ion-exchange to a mixed magnesium-hydrogen zeolite of the Y crystal type, containing about 3 weight-percent MgO (35% of total zeolitic exchange capacity), and having a silica/alumina mole ratio of about 4.7. Conditions which were substantially constant throughout the run in both the hydrofining and the hydrocracking reactor were: Pressure 1,500 p.s.i.g., hydrogen-to-oil ratios about 6,000–8,000 s.c.f./b. of feed. Liquid hourly space velocities were about 0.8 in the hydrofiner and 1.5 in the hydrocracker. The hydrocracking catalyst was divided into three separate beds of equal volume, with provision for the introduction of cool quench hydrogen in the two intermediate zones between the catalyst beds.

With the two reactors at essentially room temperature the hydrofining catalyst bed was brought up to about 450° F., and the hydrocracking bed up to about 350° F. by passing a heated stream of hydrogen in series through the two reactors. Then, operation was commenced by feeding the hydrogen-pretreatment feed mixture to the hydrofiner at an initial inlet temperature of about 448° F., while cooling the hydrofiner effluent to about 322° F. prior to its entry into the first bed of hydrocracking catalyst. Following this initial contacting sequence, temperatures of the inlet feed to each reactor were incrementally raised in conjunction with the gradual shift from pure pretreatment feed to pure process feed, as indicated in the following schedule:

TABLE 3

| Time after start of feed (hours) | Feed | Hydrofiner temp., ° F. | | Hydrocracker temp., ° F. | |
|---|---|---|---|---|---|
| | | Inlet | Avg. | Inlet | Avg. |
| 3 | 100% pretreat | 448 | 437 | 322 | 350 |
| 7 | do | 522 | 492 | 283 | 300 |
| 11 | do | 537 | 555 | 362 | 364 |
| 16 | do | 549 | 580 | 374 | 385 |
| 21 | do | 549 | 580 | 388 | 423 |
| 24 | do | 571 | 591 | 385 | 418 |
| 28 | do | 592 | 618 | 380 | 400 |
| 32 | do | 618 | 641 | 390 | 400 |
| 38 | 25% process; 75% pretreat. | 642 | 710 | 393 | 398 |
| 42 | 50% process; 50% pretreat. | 632 | 682 | 400 | 397 |
| 46 | 50% process; 50% pretreat. | 637 | 685 | 442 | 440 |
| 50 | 75% process; 25% pretreat. | 647 | 708 | 502 | 505 |
| 52 | 100% process | 644 | 709 | 523 | 523 |
| 56 | do | 643 | 714 | 566 | 567 |
| 68 | do | 644 | 727 | 633 | 631 |
| 80 | do | 644 | 726 | 693 | 709 |
| 92 | do | 642 | 723 | 696 | 713 |

At the end of this 92-hour start-up procedure, the desired initial run conditions had been reached, with about 40% conversion of the feed to 400° F. and end-point gasoline at an average bed temperature of about 713° F. The reactor temperature profile at this point is depicted by curve B of FIGURE 2.

In contrast to the foregoing, in another start-up employing the same catalysts, and approximately the same temperature schedules, but omitting the nitrogen-free pretreatment feed, using the high-nitrogen process feed throughout, the results depicted in curve A of FIGURE 2 were attained. In other words, the 40% conversion level was not obtained in this case until the average bed temperature had reached about 762° F., with about the first one-third of the catalyst bed being essentially inactive, as indicated by the flat temperature profile. In this latter run, there was a period of several hours during which the hydrofiner effluent contained in excess of about 200 parts per million of organic nitrogen, this being the period before the operative hydrofining temperatures of about 650° F. had been reached. It is evident therefore that allowing these undecomposed organic nitrogen compounds to contact the hydrocracking catalyst caused a substantial deactivation of the first part of the bed upon which they were selectively adsorbed. In the low-nitrogen pretreatment run, the hydrofiner effluent did not at any time contain more than about 50 parts per million of organic nitrogen.

*Example II*

This example illustrates more specifically the desirable effect of pretreating the hydrocracking catalyst with a low-nitrogen feedstock before it contacts the high-nitrogen feedstock.

A continuous 44-day hydrocracking run was carried out using the same hydrocracking catalyst as in Example I, and the same general processing conditions, except that the feed throughout the 44-day period was a relatively pure hydrocracking recycle oil boiling between about 400° and 750° F., and containing about 1 part per million of nitrogen. Using this feedstock, a 60% conversion to gasoline per pass was obtained at 1.5 space velocity and an initial stable hydrocracking temperature of about 525° F. As the run progressed it was necessary to raise the temperature incrementally in order to maintain the 60% conversion. During the first 26 days of the run, the recycle gas was essentially sulfur-free, and during the last portion a sour recycle gas was used. At the end of the 44-day period, the hydrocracking temperature had reached 582° F., indicating a substantial deactivation of the catalyst. Normally it would be expected that the catalyst at this stage would be much less active for all hydrocracking purposes than the fresh catalyst was.

At this point, the flow of nitrogen-free feedstock was discontinued, and a total hydrofiner effluent containing less than about 40 parts per million of organic nitrogen, but substantial amounts of ammonia, was passed over the catalyst while raising the temperature to compensate for the effect of the ammonia. It was found in this case that the 40% conversion obtained in Example I could be obtained at the same temperature as was required for the fresh catalyst in Example I. This startling result indicates that the 44-day hydrocracking run in the absence of nitrogen effected a pretreatment of the catalyst, such that its activity for hydrocracking in the presence of ammonia was at least equal to that of the fresh catalyst employed in Example I.

Results analogous to those described in the foregoing examples are obtained when other feedstocks, other catalysts and other hydrocracking conditions within the purview of the broad disclosure are substituted in the said examples. It is not intended that the invention should be limited to the details described herein, since many variations may be made by those skilled in the art without departing from the scope or spirit of the following claims.

We claim:
1. A method for pretreating a hydrocracking catalyst and utilizing the same for the hydrocracking of nitrogen-containing hydrocarbon feedstocks, said catalyst comprising a refractory solid cracking base upon which is distended a minor proportion of a transitional metal hydrogenating component, which comprises contacting said catalyst with a pretreatment hydrocarbon feedstock plus added hydrogen at temperatures between about 300° and 650° F., said pretreatment feedstock containing less than about 50 parts per million of organic nitrogen, and then utilizing said pretreated catalyst for the hydrocracking of a process feedstock with added hydrogen under hydrocracking conditions including temperatures between about 650° and 825° F., said process feedstock having a substantially higher total nitrogen content than said pretreatment feedstock.

2. A process as defined in claim 1 wherein said hydrocracking catalyst comprises a minor proportion of a Group VIII noble metal hydrogenating component combined with a crystalline, zeolitic molecular sieve of the Y crystal type wherein the zeolitic cations are selected mainly from the class consisting of hydrogen and divalent metals.

3. A process as defined in claim 1 wherein the nitrogen in said process feedstock is mainly in the form of ammonia.

4. A process as defined in claim 1 wherein said pretreatment contacting, and said hydrocracking of process feedstock is carried out at a pressure between about 500 and 2,500 p.s.i.g.

5. A process as defined in claim 1 wherein said pretreatment contacting is continued for a period of time between about 6 hours and 50 days.

6. An integral hydrofining-hydrocracking process for converting a hydrocarbon process feedstock containing more than about 50 p.pm. of organic nitrogen to lower boiling hydrocarbons, which comprises:
(A) subjecting a hydrocracking catalyst comprising a minor proportion of a transitional metal hydrogenating component deposited upon a solid cracking base to a pretreatment contacting with a relatively pure hydrocarbon feedstock containing less than about 50 parts per million of organic nitrogen, at temperatures between about 300° and 650° F. in the presence of added hydrogen and at pressures between about 500 and 2,500 p.s.i.g.;
(B) subjecting said process feedstock to an initial pre-hydrofining treatment in the presence of a hydrofining catalyst and hydrogen to convert most of the organic nitrogen in said feedstock to ammonia, and recovering an ammonia-containing effluent from said hydrofining;
(C) subjecting said ammonia-containing effluent to catalytic hydrocracking at temperatures between about 650° and 825° F. in contact with the hydrocracking catalyst pretreated as specified in step (A); and
(D) recovering low-boiling hydrocarbons from said hydrocracking step (C).

7. A process as defined in claim 6 wherein said hydrocracking catalyst comprises a minor proportion of a Group VIII noble metal hydrogenating component combined with a crystalline, zeolitic molecular sieve of the Y crystal type wherein the zeolitic cations are selected mainly from the class consisting of hydrogen and divalent metals.

8. A process as defined in claim 6 wherein said hydrofiner effluent contains less than about 50 parts per million of organic nitrogen.

9. A process as defined in claim 6 wherein said hydrocracking of ammonia-containing hydrofiner effluent is carried out at a pressure between about 500 and 2,500 p.s.i.g.

10. A process as defined in claim 6 wherein said pretreatment contacting is continued for a period of time between about 6 hours and 50 days.

11. A process as defined in claim 6 wherein said process feedstock is a gas-oil boiling between about 400° and 1,000° F., and wherein the low-boiling hydrocarbons recovered in step (D) comprise gasoline-boiling-range hydrocarbons.

12. In an integral catalytic hydrofining-hydrocracking system wherein a hydrocarbon process feedstock containing more than about 50 p.p.m. of organic nitrogen is hydrofined with added hydrogen over a bed of hydrofining catalyst at temperatures between about 650° and 850° F., and wherein ammonia-containing effluent from said hydrofining is then hydrocracked over a bed of hydrocracking catalyst at temperatures between about 650° and 850° F., the improved method for establishing said system and raising the temperature of said catalyst beds from initial temperatures below about 500° F. to the desired hydrofining and hydrocracking temperatures without damaging said hydrocracking catalyst, which comprises:

(1) establishing an initial contacting sequence wherein a pretreatment mixture of hydrogen and a relatively pure hydrocarbon feedstock containing less than about 50 p.p.m. of organic nitrogen is preheated and passed through said hydrofining catalyst bed and then through said hydrocracking catalyst bed;

(2) incrementally raising the hydrofining inlet temperature of said pretreatment mixture, thereby gradually raising the bed temperature of said hydrofining catalyst to the desired initial hydrofining temperature for said hydrocarbon process feedstock, between about 650° and 750° F.;

(3) during at least the terminal portion of said initial contacting sequence, cooling the effluent from said hydrofining catalyst bed so as to maintain the hydrocracking catalyst bed at a temperature below a level at which more than about 75% conversion per pass to 400° F. end-point gasoline will occur therein;

(4) establishing an interim contacting sequence wherein hydrogen and a blend of said process feedstock and said relatively pure feedstock is passed through said hydrofining catalyst bed and through said hydrocracking catalyst bed;

(5) during said interim contacting sequence, maintaining the temperature in said hydrofining catalyst bed at a desired hydrofining level between about 650° and 850° F. while concurrently (a) increasing the proportion of process hydrocarbon feedstock in said blend, and (b) raising the temperature of the hydrofiner effluent so as to preheat said hydrocracking catalyst bed to the desired initial hydrocracking temperature for said process feedstock, between about 650° and 775° F.; and (6) terminating said interim contacting sequence and establishing the finally desired contacting sequence with process feedstock plus hydrogen passing through said hydrofining and hydrocracking catalyst beds at the desired hydrofining and hydrocracking temperatures.

13. A process as defined in claim 12 wherein said hydrocracking catalyst comprises a minor proportion of a Group VIII noble metal hydrogenating component combined with a crystalline, zeolitic molecular sieve of the Y crystal type wherein the zeolitic cations are selected mainly from the class consisting of hydrogen and divalent metals.

14. A process as defined in claim 12 wherein said pretreatment contacting, and said hydrocracking of process feedstock is carried out at a pressure between about 500 and 2,500 p.s.i.g.

15. A process as defined in claim 12 wherein said hydrofiner effluent contains less than about 50 parts per million of organic nitrogen throughout the process.

16. A process as defined in claim 12 wherein said pretreatment contacting is continued for a period of time between about 6 hours and 50 days.

References Cited by the Examiner

UNITED STATES PATENTS

| | | | |
|---|---|---|---|
| 2,944,005 | 7/60 | Scott | 208—109 |
| 2,944,006 | 7/60 | Scott | 208—89 |
| 2,971,904 | 2/61 | Gladrow et al. | 208—46 |
| 2,983,670 | 5/61 | Seubold | 208—110 |
| 3,099,617 | 7/63 | Tulleners | 208—110 |

ALPHONSO D. SULLIVAN, *Primary Examiner.*